(12) United States Patent
Outram

(10) Patent No.: US 8,587,611 B2
(45) Date of Patent: Nov. 19, 2013

(54) DOCUMENT VERIFICATION SYSTEM

(75) Inventor: Matthew Outram, Leighton Buzzard (GB)

(73) Assignee: FUJIFILM Corporation, Tokyo (JP)

( * ) Notice: Subject to any disclaimer, the term of this patent is extended or adjusted under 35 U.S.C. 154(b) by 328 days.

(21) Appl. No.: 12/674,437

(22) PCT Filed: Aug. 22, 2007

(86) PCT No.: PCT/GB2007/003206
§ 371 (c)(1),
(2), (4) Date: Oct. 11, 2011

(87) PCT Pub. No.: WO2009/024734
PCT Pub. Date: Feb. 26, 2009

(65) Prior Publication Data
US 2012/0020513 A1    Jan. 26, 2012

(51) Int. Cl.
*G09G 5/00* (2006.01)
*G06F 17/00* (2006.01)
(52) U.S. Cl.
USPC .......................................... 345/619; 715/274
(58) Field of Classification Search
CPC ...... G06F 17/212; G06F 3/1256; G06T 11/60
USPC .......................................... 345/619; 715/274
See application file for complete search history.

(56) References Cited

U.S. PATENT DOCUMENTS

| | | | |
|---|---|---|---|
| 6,046,818 A | 4/2000 | Benson | |
| 6,771,384 B1 | 8/2004 | Laverty et al. | |
| 6,927,865 B1 | 8/2005 | Kujirai et al. | |
| 7,177,045 B2 | 2/2007 | Goel et al. | |
| 2004/0187073 A1 | 9/2004 | Tuijn et al. | |
| 2004/0205641 A1 | 10/2004 | Shimizu | |

FOREIGN PATENT DOCUMENTS

| | | |
|---|---|---|
| EP | 1195266 A2 | 4/2002 |
| JP | 2001-125765 | 5/2001 |
| JP | 2003248564 A | 9/2003 |
| JP | 2003-320740 A | 11/2003 |
| JP | 2005339250 A | 12/2005 |
| JP | 2006-192580 | 7/2006 |

OTHER PUBLICATIONS

Japanese Office Action dated Jul. 24, 2012, issued in the corresponding Japanese Patent Application.
"Fiery Impose Edition"[Online] URL:http://www.efi.com/documents/products/corporate/fiery/pdf/Fiery_System_8e_Imp [retrieved on Jan. 28, 2008.
http://www.desingner-info.com/Writing/page_imposition.htm Web page article on page imposition by Tom Arah, dated Oct. 2001.
http://www.compose.co.uk/PDFs/New/BC_09_PDFImpose.pdf, Compose PDF Imposition 4, printed dated Mar. 16, 2006.
Search Report for GB0606308.5 dated Jul. 11, 2008.

*Primary Examiner* — Jeffery A Brier
(74) *Attorney, Agent, or Firm* — SOLARIS Intellectual Property Group, PLLC

(57) ABSTRACT

The present invention relates to a computer-implemented method, and associated apparatus, for printed document verification. A document to be printed will have related content data, imposition data, and finishing data, wherein the imposition data describes at least one imposition signature for the document and the finishing data describes the application of one or more finishing operations to be performed in order to produce the printed document. This data is obtained using an input device and is passed to a representation system that generates an electronic output representation of the document to be printed and finished, in accordance with the said content, imposition and finishing data. An operator can then inspect this electronic representation to check for errors that might arise.

18 Claims, 10 Drawing Sheets

DOCUMENT VERIFICATION SYSTEM

This invention relates to methods and apparatus for verifying a printed document, in particular through previewing the document to be printed.

The concept of imposition is well known within the printing industry and concerns the arrangement of pages of a document on a sheet of paper or other print medium so that when folded in the correct manner they will create a finished publication or part of a publication. This arrangement of pages is referred to as an imposition layout. To aid the printing process a variety of printers' marks are often applied to the imposition layout to produce what is known as an imposition signature.

Commonly, the document to be published is received in a page description language (PDL) file wherein the pages of the document are arranged in reader order suitable for display on a standard computer system.

Most pre-press workflow systems have the ability to combine the content of a document stored in the PDL file with an imposition signature and then to create an image on the printing plates used in the printing press to print the document. The printed output of an imposition signature may contain one or more imposition sheets. The printing medium is usually printed on both the front surface and back surface of the sheet.

Typically pre-press workflow packages are able to display, on screen, a representation of the printed result. This view is most commonly used to detect problems prior to printing. The printed result is typically made up of several separations, wherein each separation is associated with a different printing ink colour. The view will typically allow the user to select, in any combination, the separations to view so that print manufacturing details can be explored (such as overprint, trapping etc). Such viewer applications typically allow different combinations of separations to be viewed together, the zoom factor to be altered, and the on-screen colours to be adjusted along with other standard viewer type features. A pre-press operator will also be able to print out a facsimile (or proof) of the imposition sheet for verification.

After the printing of an imposition signature, the job of creating a publication requires a number of additional steps ('finishing'). Each finishing step has to be correct and consistent with the others. For example, the creation of a typical commercial printing publication consists of several steps including: printing, cutting, stacking and folding, binding and trimming the sheets. These steps are carried out by a variety of known printing machinery such as the Muller Martini Valore Saddle Stitcher and the Apollo Stacker A typical printing run for a publication may consist of a long sequence of individual steps. The sequence of steps that must be managed automatically is becoming more complex as the printing line becomes increasingly automated and publishing clients demand more flexibility at lower costs. For example, several different publications are often combined on one sheet (ganged) in order to save paper and each publication can further contain several different folded sheets. Each sheet can further be printed on different media. When inspecting the imposition signature the pre-press operator typically has to rely on their experience to notice when errors may occur. Whilst this process presents difficulties for even the most skilled operator, with the introduction of 'on-demand' publishing, managing this process and detecting errors becomes near impossible. In these situations machinery, personnel, and even locations may change at a moments notice and often the operator will require several dummy runs through the printing line to finalise the imposition layout and finishing details. This, of course, adds time delays and increases the production costs of the publication.

According to a first aspect of the present invention, there is provided a computer implemented method of printed document verification comprising obtaining content data relating to the content of a document to be printed; obtaining imposition data describing at least one imposition signature for the document; obtaining finishing data describing the application of one or more finishing operations to be performed in order to produce the printed document; and generating an electronic output representation of the document printed and finished in accordance with the said content, imposition and finishing data.

A new approach to the error checking of impositions is proposed. The main purpose of the new system is to allow imposition signature, folding and finishing errors to be detected before a publication is committed to a substrate. It also aids in the diagnosis and correction of such errors. Such a system is required for checking the work of an automated imposition creation system.

Hence, an operator is able to inspect the output representation of the printed document to check that no errors are present without physically producing the printed document. The representation system generates a range of views, by reading imposition and finishing parameters. In all views, currently displayed items can be rotated in any direction and individual pages can turned in both ways. The system is capable of simulating both publication composition, the visual assembly of sheets through the process of sheet stacking, cutting, folding and binding, and publication decomposition, the reverse process, in a three-dimensional graphical environment. Publications can thus be composed from their parts or decomposed from the bound work to allow for easy checking.

According to a second aspect of the present invention, there is provided a printed document verification system comprising an input device adapted to obtain content data, relating to the content of the printed document, imposition data, describing at least one imposition signature for the document, and finishing data, describing the application of one or more finishing operations in order to produce the printed document; a representation system comprising a processor adapted to generate an electronic output representation of the printed document in accordance with the said content, imposition and finishing data; and an output device adapted to output said output representation.

An embodiment of the invention will now be described with reference to the accompanying drawings, in which.

Figure 1:
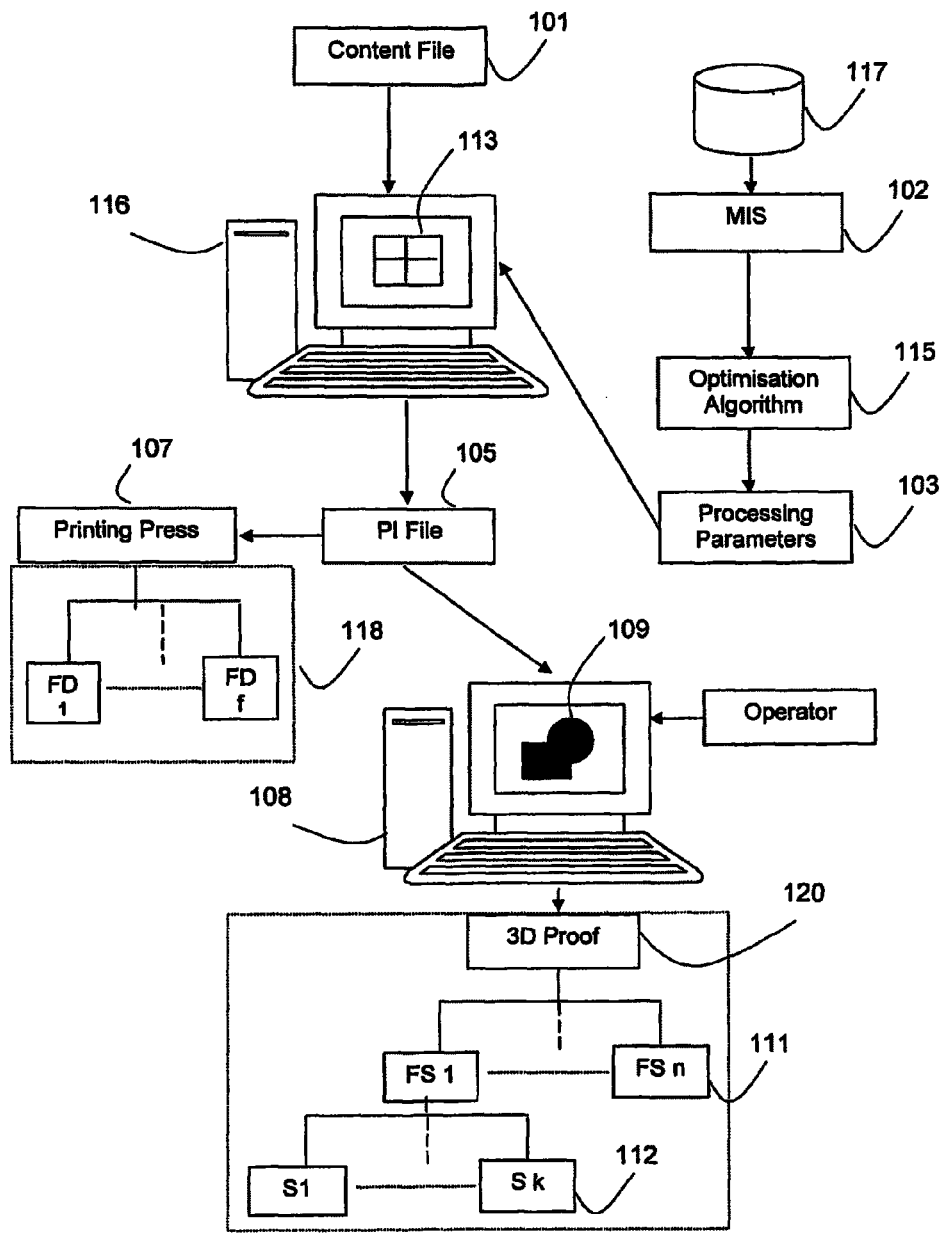
FIG. 1 shows a system of verifying printed documents according to a first embodiment of the current invention.

With reference to FIG. 1, an apparatus used to implement the current invention will now be described. A pre-press environment comprises an imposition system 116, a management information system (MIS) 102 connected to a database 117, and a representation system 108. Both the imposition system 116 and the representation system 108 comprise a processor, a hard disk, a display device connected to a graphics processor and input/output devices, such as a mouse, a tablet, a keyboard, a touch-screen or a wireless indicator.

The pre-press environment will be used in conjunction with a printing press 107 and finishing devices 118. This communication can be achieved using network communications (LAN/WAN/Internet), or through physical locality. The printing press 107 will comprise one or more printing apparatus 118 forming a printing or production line. Typically, each printing apparatus will be used for a different finishing operation.

Information relating to the operation of the printing press 107 will be managed by the MIS 102, which typically comprises the database 117 and database management software. It is used by the management of the printing press 107 to aid in the operation of the company, and contains, for example, optimised printing schedules, media stock information, costing information and information about the finishing devices 118, including machine availability and appropriate operating parameters.

The imposition system 116 is adapted to produce an imposition signature 113 on receipt of content information concerning a document to be printed. This content information is stored electronically in a file 101, such as in XML format. The resulting imposition signature can be stored in a printing information (PI) file 105, for example a file system comprising PDF or TIFF representations of the content pages and an XML file containing data specifying a set of processing parameters 103. The PI file will contain the sequence that the finishing operations will be applied.

The imposition system 116 is further adapted to receive processing parameters 103 obtained from the MIS. These parameters can be used in the production of the imposition signature. The MIS may further comprise one or more optimisation algorithms that take a description of the required publication (delivered as content data in file 101), the company database 117 and information from the operator as inputs and decide on the appropriate finishing devices 118 to use for the publication.

For example, the content data could contain 32 pages of A4 size and the operator could select 'glossy' as a media type. An optimisation algorithm 115 would then look up all glossy media in stock in the company database, and calculate which particular glossy media would provide the cheapest publication. The number of pages, set within the content data, would then allow the optimisation algorithm to choose the media size, the number of sheets and the number of pages per sheet. The optimisation algorithm 115 would then look up all printing apparatus present in the company database 117 designed to print and finish the particular size and type of the chosen media, and filter the results to select free machines. Output information in the form of processing parameters 103 would then be provided to the imposition system 116 to create the imposition signature 113.

The representation system 108 is adapted to produce electronic output representations 109 of a variety of finishing operations. It is further adapted to receive a printing information (PI) file 105 as an input. This file contains data comprising the imposition signature, complete with imposition layout and printers' marks, together with details of all the finishing operations to be applied to the printed imposition sheet that will be created from the imposition signature. This data thus provides all the parameters required to build virtual models of the printed document at various stages. Often, the data will contain multiple imposition signatures relating to different sections.

Instruction sets defining a three-dimensional modelling software suite are stored upon the hard disk of the representation system 108. The processor then executes these instruction sets. This suite may be adapted from those known in the art, such as adapted computer aided design (CAD) packages or adapted modelling software suites, such as Lightwave modeller or Rhinoceros 3D. Alternatively, the software can be built using known object-orientated methods and libraries. For example, a geometric modelling kernel can be built around a number of known programming modules, which are distributed with their own application programming interfaces (APIs). These modules allow the development of parametric feature-based modelling environments and freeform surface modelling systems, which can be interfaced into standard pre-press systems.

The representation models described herein can be implemented using any method known in the art, for example, using constructive solid geometry or polygonal modelling, or through the use of implicit surfaces or B-splines. Further known methods and systems can be used to generate the animations that demonstrate the finishing steps applied to create subsequent representations. Furthermore, the method of generating a representation can be performed by bespoke hardware, such as a dedicated graphics integrated circuit connected to input/output devices or an embedded system with dedicated modelling capabilities. Alternatively, it can be performed by implementing, on a general purpose processor, instructions stored upon a computer read-able medium or transmission-type medium.

A particular three-dimensional representation is built by providing an interface between the received PI file 105 data and the parametric modeller forming part of the representation system 108. Specific functions will extract the relevant geometric data from the imposition signature and use this geometric data in the creation of three-dimensional objects. For example, the PI file will specify the media size and media type to be used to create each imposition sheet. This information can be used to look-up the required height, width and depth parameters for a three-dimensional model of a cuboid. A cuboid can then be generated with the appropriate dimensions. The content data, containing the graphics and text to be printed, can then be rendered as a surface and applied to the cuboid, generating a three-dimensional model of a printed imposition sheet.

The representation system 108 is further adapted to apply virtual finishing operations to the generated three-dimensional model. Within the printing press 107, a real printed imposition sheet will be manipulated by a series of finishing devices 118. Each virtual finishing operation thus consists of manipulating the three-dimensional model based on the real life manipulations applied by each finishing device. The virtual finishing operation may consist of modelling the process of creasing, cutting, embossing, gluing, perforating, strapping, stacking, folding, collecting, ganging, gathering, binding, trimming or any other operation known in the art of publishing.

The finishing data in the PI file 105 contains the details of each finishing operation, together with a corresponding set of finishing device references. As previously stated this may be stored in XML format. The representation system 108 will parse the finishing data to extract the list of finishing operations to be applied to a virtual imposition sheet. For each operation on the list, the finishing device reference is extracted from the finishing data, together with parameters specifically related to the selected finishing operation. For ease of manipulation, the finishing parameters can be designed to be finishing device independent.

For example, a fold may be performed on a Horizon AFC-546AKT. This fold may be referenced through a fold catalogue entry. Entries in the catalogue may either be industry standard entries or may be user defined. The entry may take a form such as "F 8-4", which is translated as "fold an 8 page imposition layout with fold option 4". Fold option 4 is then detailed in the catalogue. Thus the geometric manipulations associated with this fold can be extracted from the catalogue and modelled within the representation system modelling environment. The manipulations can be coded within a bespoke object or function within the representation system. For example, a given fold could be represented within the environment as a method that performs a clockwise rotation of 180 degrees of a sub-section of virtual imposition sheet object about a line in the centre of the sheet object. These methods take the dimensions of the particular imposition sheet being manipulated as input data.

If the details of the finishing operation are dependent on the finishing device to perform the operation, each finishing device can be modelled as an object, wherein the geometric manipulations associated with a finishing operation are provided as methods of this object. Thus the above fold could be initiated by a call line such as "output_object=machineX.fold (input_object, P8, F4)", which will return a handle to a new three-dimensional object or group of objects representing the result of the finishing operation, such as those shown in group 111. This output object is then displayed on screen through the object methods provided by the modelling libraries.

If the details of the finishing operation are independent of the finishing device, each finishing operation can be modelled as an object, which has associated methods that take an existing three-dimensional model and finishing parameters as input data and produce an output object representative of the geometrical manipulations involved in the finishing operations. The content data can either be already contained within the object models or added, with the appropriate deformations, to the page slots on a manipulated imposition sheet.

The final output of the representation system 108 is a three-dimensional proof 120 of the document to be published. This is a model object, which is linked to a group of intermediate processed (or 'finishing step'-'FS') objects 111.

Figure 2:
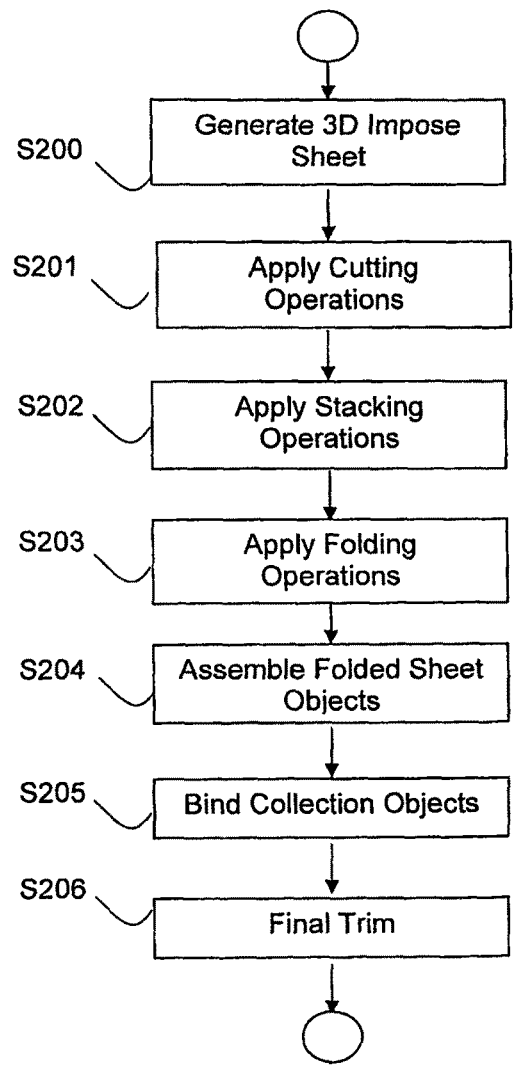
FIG. 2 shows a flowchart demonstrating a typical set of finishing operations to be performed on a representation.
Figure 3:
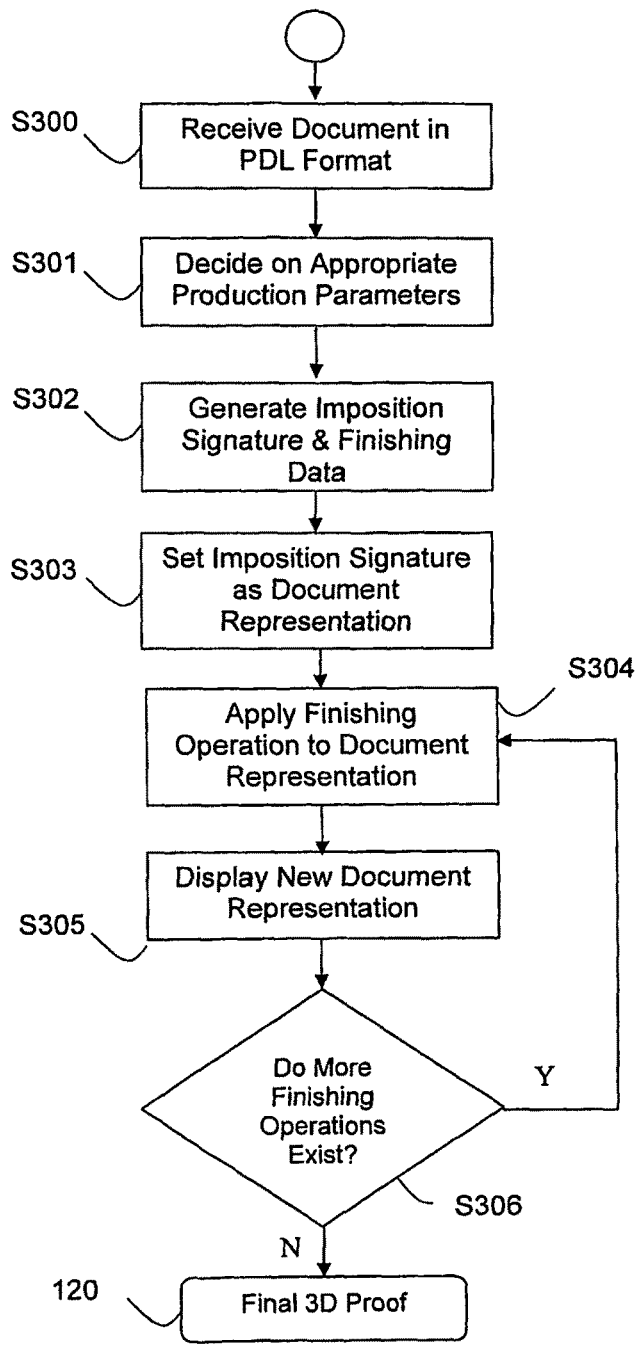
FIG. 3 shows a flowchart demonstrating a method of producing printed document representations according to a first embodiment of the current invention.

An example of the method of the current invention will now be presented with reference to FIG. 2 and FIG. 3. It is to be noted that this example should not be limiting and can be applied to other forms of published documents.

A document to be published consists of a 32-page inner and a 4-page cover. An operator of a pre-press computer system will receive this document to be published, S300. This document may be represented electronically in a common PDL file, such as a PDF, postscript or TIFF or, alternately, supplied physically and converted to electronic form through input methods known in the art, such as raster scanning. Typically, the document is provided by a design team or advertising agency that is responsible for the creative content of the publication. The document will have pages of a certain size and usually contain a mixture of images and text.

The operator will then inspect the document and make a series of production decisions, S301, directed towards the commercial printing of a document. These decisions will often be independent from the artistic considerations, and cover issues related to cost and production efficiency. Examples of the decisions that need to be made are: how many copies are to be produced; the production schedule; what media is to be used; what is the specifications of the selected media; is there to be one or more sections of a different media; how many colours are to be used; whether any spot colours are required; what printing apparatus is available; how many sheets are to be used; and what finishing steps are required. These examples are non-exhaustive and will depend on particular circumstances.

After these decisions have been made an imposition layout will then be produced; either manually, relying on the operator's skill and experience, or automatically, using imposition systems known to the art. To automatically produce an imposition layout the operator needs information derived from the original PDL file and the following information: the size of the media, e.g. B1, A1 or any of the standard paper sizes, the number of pages to place on the media sheet, e.g. 8 or 16, and the printing apparatus and finishing devices available. The information retrieved from the PDL file contains the number of pages and the different sections of the publication, e.g. cover and inner.

The imposition system can be adapted to obtain any of this information from the MIS, or from algorithms that use the MIS information as input data. For example, the number of pages and content type could be retrieved from the PDL file and input to an optimisation algorithm that inspects the media stock of the press, performs cost calculations and then matches the content type with a media type in stock. Available printing apparatus suitable for the media type are then selected, and the algorithm determines parameters based upon these apparatus, such as number of pages per sheet, folding and stacking types etc.

Alternatively, the current invention provides a wizard or graphical user interface, which directs the operator through the decisions to be made. This wizard may limit production options based on information from the MIS. Whatever method is used, the end result is an imposition layout and a collection of data ('finishing data') related to the finishing operations required to produce the publication.

Figure 5:
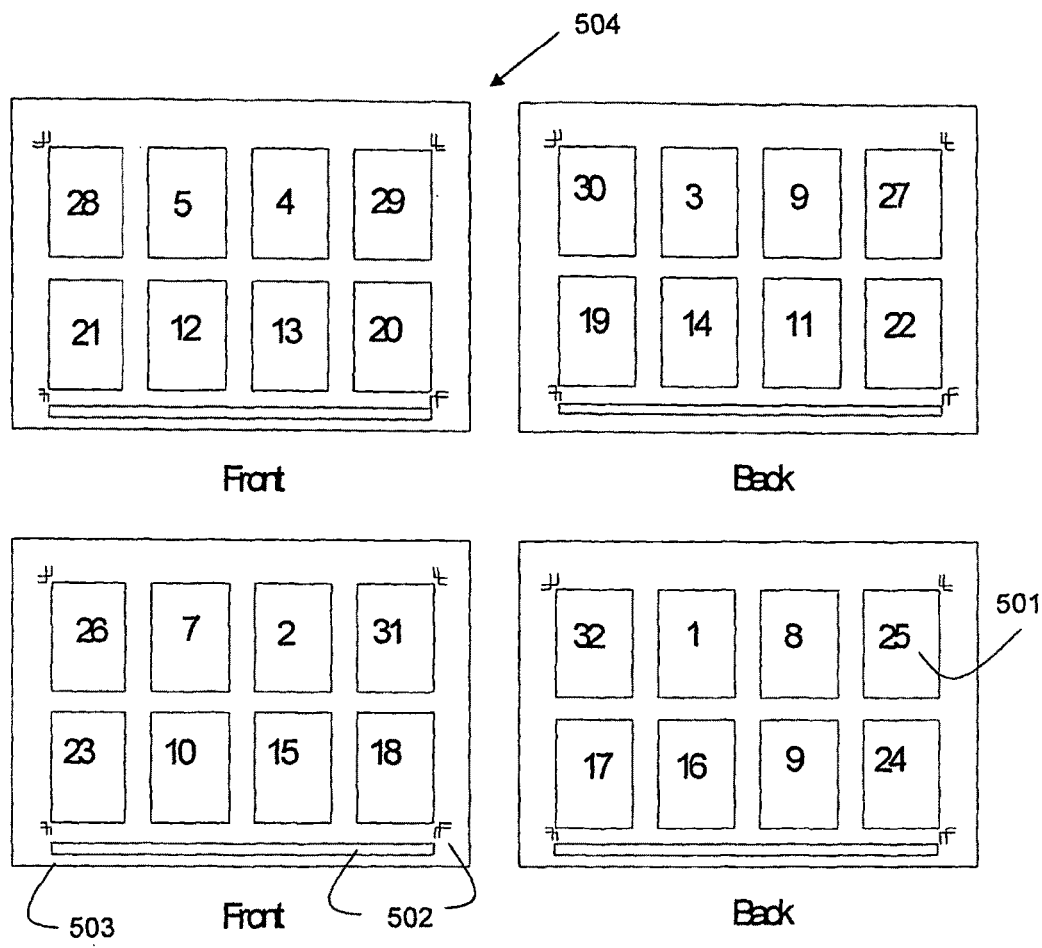
FIG. 5 shows the imposition signature of an inner section of a document to be published.
Figure 6:
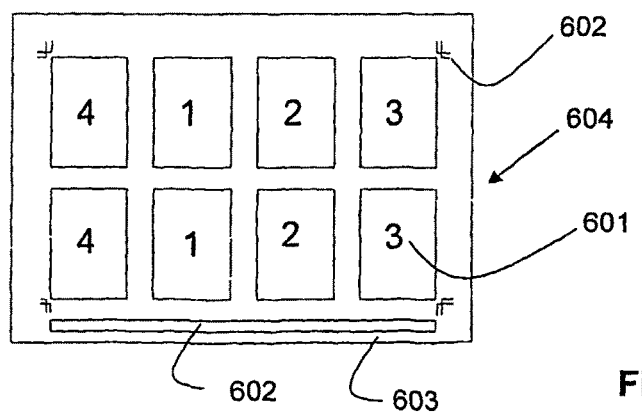
FIG. 6 shows the imposition signature of a cover section of a document to be published.

The operator will then add a series of printer's marks to the imposition layout to produce an imposition signature. As the cover and inner of the document are to be printed on different media, different imposition signatures will be required for each section. The imposition signature for the inner is shown in FIG. 5 and the imposition signature for the cover is shown in FIG. 6.

The printers' marks 502, 602 may include colour bars, cutting lines, collation markers, orientation markers, fold lines, register marks or any other marks known to the art. These marks can be assigned automatically or manually. If added automatically they may have been predetermined by the options selected in the wizard or automatically calculated by the said MIS optimisation algorithms. For example, fold lines and orientation markers will depend on the imposition layout and the fold type used.

The imposition signature will then be combined with the document content, stored in the PDL file, by placing the text and graphics of each page in the PDL file, into the page slots in a graphical representation of the imposition layout. The imposition signature is then stored alongside the finishing data in a printing information (PI) file. This is displayed in step S302 of FIG. 3. This file can then be forwarded to the printing press for the actual production of the publication or viewed on a standard computer system with appropriate software.

Before sending the PI file to the printing press the file will be loaded into the representation system in order to produce a representation of the document at each stage of the finishing process. These representations will typically be inspected by a pre-press operator but could be forwarded to any of the printing staff.

After the PI file is loaded or imported into the representation system 108, a first representation is created. This representation displays the imposition signature 113 with the document content and printers' marks in place as a virtual imposition sheet, S200 and S303. This representation can be displayed visually within a three dimensional virtual world on the representation system using the techniques previously described. In the current example, the virtual imposition sheet is generated as a three-dimensional cuboid but in practice could be approximated by a two-dimensional plane. The operator will then view this representation through a standard display device, such as a LCD monitor or CRT display device.

The virtual imposition sheets can then be seen and manipulated within this three dimensional world. For example, each virtual imposition sheet can be generated using the three-dimensional model previously described and rotated so as to expose the rear-side for basic rear side checking, such as checking page content or alignment. Alternatively, the operator will be able to lift and turn the sheet edge to check the rear-side of the virtual imposition sheet. Some or all of the sheets for some or all of the signatures can be viewed. The printers' marks can further be switched on and off in the view area to aid legibility.

Now the finishing operations can be applied to the imposition sheet model, S304. Often in commercial printing, pages for different publications will be included on the same printed imposition sheet. In this case the printed sheet will need to be cut by cutting apparatus to separate the publications. The relevant cuts will be marked by the appropriate printers marks on the virtual imposition sheet. If a cut is required the representation system will enable the operator to make a virtual cut, S201, in the virtual imposition sheet, representative of the cutting operation to be performed by the cutting apparatus.

For example, an icon or pointer representing pair of scissors may be available to the operator, which enable the operator to make 'cuts' in the virtual imposition sheet. This icon or pointer can then be manipulated by input means known in the art, such as computer mice, tablets, keyboards, or known virtual reality interface equipment. The representation system will only allow a virtual cut to be made when it detects an input signal from the input means within a two or three dimensional range surrounding the cut lines dictated by the imposition signature. When this input signal occurs it will initiate objects methods that generate a virtual cut, e.g. "cut_object_group=machineY.cut(input_object, cut_line)", where the "cut_object_group" is the group of parametric objects that result from the virtual cut. If the cut separates one imposition sheet into two, two new three-dimensional sheets will be produced with geometric dimensions calculated by factoring in the line or plane of the cut. The result of this finishing operation can now be represented on screen S305.

Subsequently, the representation system 108 checks the list of finishing operations extracted from the finishing data, S306. As the inner of the document to be printed is constructed from two virtual imposition sheets; an animated view of sheet stacking will be available, S202. This animation will stack the two virtual imposition sheets in a manner identical to the designated stacking apparatus. This will typically involve aligning two or more three-dimensional objects with a common set of reference axes and extracting the nature of the alignment from the finishing data. This may be initiated by a command such as "machineA.stack(input_object_group, stacking_parameters)", wherein the group of objects to be stacked is provided as an input. The stacking parameters may comprise a two-dimensional offset from a two-dimensional upper surface of a first object, for a two-dimensional lower surface of a second object, (present in input_object_group), together with surface labels.

Thus if there is any misalignment introduced during this operation it will be visible to the operator. It is possible to further manipulate the stacked sheets in three-dimensions through rotation, opening pages, zooming or general translation, to check for any alignment and page flow errors.

Figure 7:
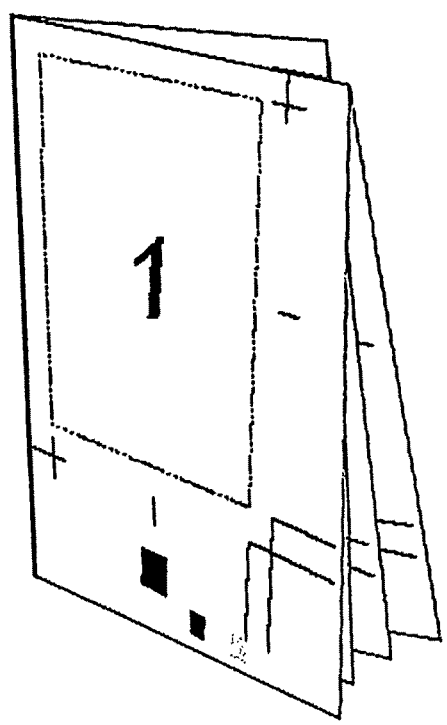
FIG. 7 shows a folding operation.

Following stacking, a representation of each folded imposition sheet, sheet-stack, or cut-sheet is generated. An example of a fold representation is given in FIG. 7 and the folding process may be initiated by a command such as that cited previously. To enable the operator to clearly follow the logical steps that generate the finished folded sheet from a set of stacked sheet objects, an animation of the sheet being folded according to the required fold catalogue entry is presented, S203. As previously described, the representation system contains a library of animations and fold configurations according to each entry in the fold catalogue. The fold catalogue code is passed to the representation system 108 within the finishing data. The operator can thus manipulate the folded object and check that the folds are as required for each section. Furthermore, the folding animation can be replayed if needed.

In modern publishing the number of available folding operations can be large with high levels of complexity. For example, modern newspaper printing often involves offsetting the centre fold of a document, to provide a lip on an outer sheet to enable advertising pamphlets or magazines to be mechanically inserted. This offset can introduce alignment errors if not taken into account. When denoting, the operator identifies the appropriate page slots in the imposition layout. Thus the current system allows an operator to check the result of multiple combinations of features, which may present non-obvious resultant errors.

If several imposition sheets have been stacked before folding, the virtual fold operation will be performed on this stack of sheet objects. This can be implemented by treating the stack of sheet objects as a single object and applying a fold method to this single object.

The representation system 108 provides a variety of options for initiating the fold animation: either the operator can select an auto-fold icon which will fold the sheet in the appropriate manner and produce the folded object that can be rotated as willed; or the operator can step through each step of the fold operation 'manually' on screen. The latter option comprises using an icon or pointer, as with the virtual scissors, which can be shown to 'grab' a side of the sheet to be folded, i.e. the edge of a plane subsection of the sheet that is to be rotated about a fold line, before 'dragging' that side about a representation of the fold line, i.e. rotating the plane subsection, in order to display a representation of the folding operation. The location of the fold lines to be displayed can be present in the imposition signature as printers' marks or added by the representation system 108 based on the fold catalogue entry. Visual cues can also be provided to aid with the 'manual' folding, such as highlighting the appropriate fold lines a particular colour or adding arrows highlighting the sides of the sheet that can be folded.

If the sheet requires cutting or stacking before the fold operation then this representation must be displayed before the fold animation is initiated. This corresponds to the fact that the representation system 108 will only allow virtual operations identical to, and in the same prescribed order as, those specified in the imposition signature and finishing data. The prescribed order is set by the finishing processes required for a particular publication and may vary for different publications. In a similar manner, once a sheet has been folded, it can only be manipulated in its folded form. Thus, again, only manipulations possible in the real world can be performed. For example, with a representation similar to FIG. 7, it would only be possible to open the unfolded corner of the folded sheet, and thus it would not be possible to view the inside of the top left corner. To return to a previous representation the folded object must be unfolded.

Alternatively, in order to allow the inside of folded sheets to be inspected, the representation system 108 provides a temporary "auto-cut" command. It can be implemented through a method related to the current representation object, for example "cut_object=current_object.cut(cut_line)". This will apply a trim finishing operation, removing a portion of the current three-dimensional model object. This operation is representative of a trim operation available on existing machinery, to the folded publication. The operator is then not restricted by the fold and can leaf through pages to verify page order and alignment. The operation can be undone by a command such as "current_object=cut_objectuncut( )", initiated by clicking on a given icon within the software suite GUI.

Figure 8:
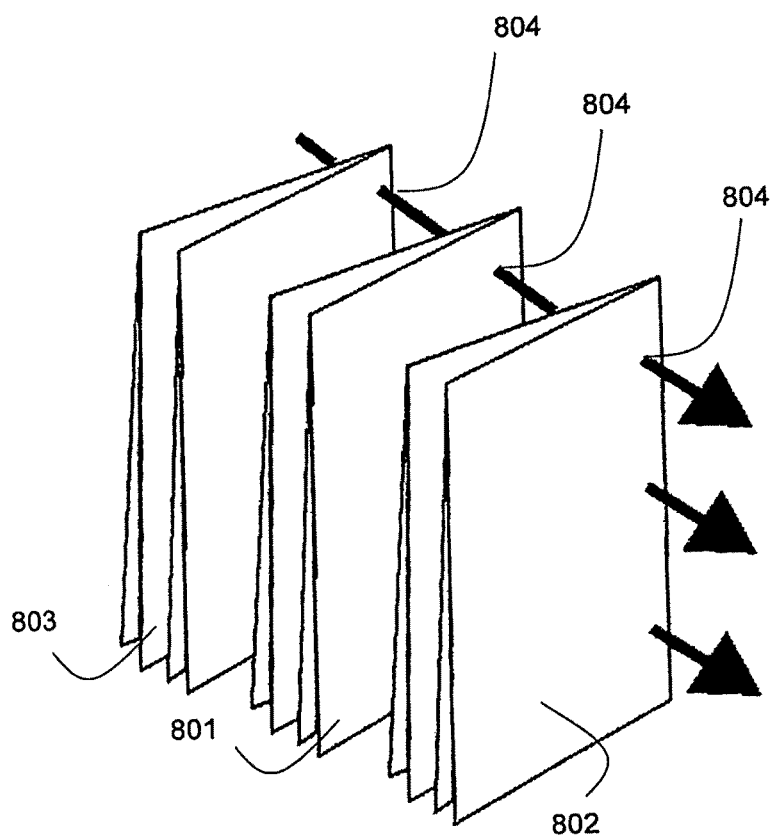
FIG. 8 shows a method of gathering multiple folded sheets of a publication.
Figure 9:
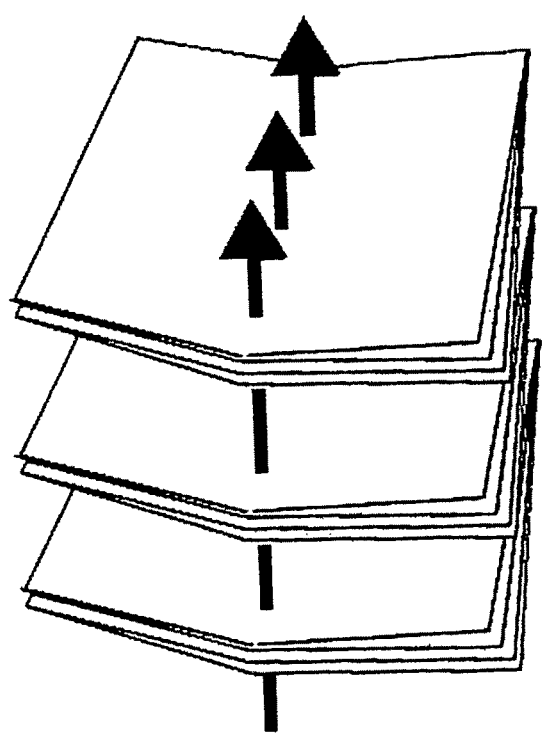
FIG. 9 shows a method of collecting multiple folded sheets of a publication.

After folding, if there are multiple folded sheets, these multiple sheets will be collected or assembled ready for binding, S204. Possible collection operations are shown in FIG. 8 ('Gathering') and FIG. 9 ('Collecting'). Such operations may be combined to give more complex assembled publications.

The representation system 108 provides a "select all" and "apply to all" command option that enables the set of finishing operations to be applied to all sheet objects that form the publication. This can be implemented by having an object family or hierarchy. A publication document object 120 will contain a series of finishing step objects, represented by group 111 in FIG. 1, and each finishing step object will contain a number of sub-section objects 112. These sub-sections may be publication sections, such as groups of pages that make up different inner and cover sections or groups of pages printed on different media, and/or multiple groups of pages that require different finishing operations, such as some pages may need laminating and some may need embossing. For example, in our example if the two imposition sheets were folded separately then collected, if the operator has stepped through the finishing operations for the first sheet object, they can automatically apply the same steps to the second sheet object. Thus the two sheets will be ready for collection.

The representation system 108 reads the type of collecting to be performed from the finishing data and applies the collecting operation to a set of folded sheet objects. This is implemented by mating certain lines or surfaces on each folded sheet object. For example, in FIG. 8, the surfaces of centre folded sheet object 801 will be mated with the surfaces of folded sheet objects 802 and 803 at the points where each arrow passes through the surface 804. These points will be specified in the finishing data, either in association with given printers' marks or implicit when given the form of collection and appropriate finishing device. For example, the command may resemble "gathered_object=machineG.gather(input_object_group)".

Figure 11:
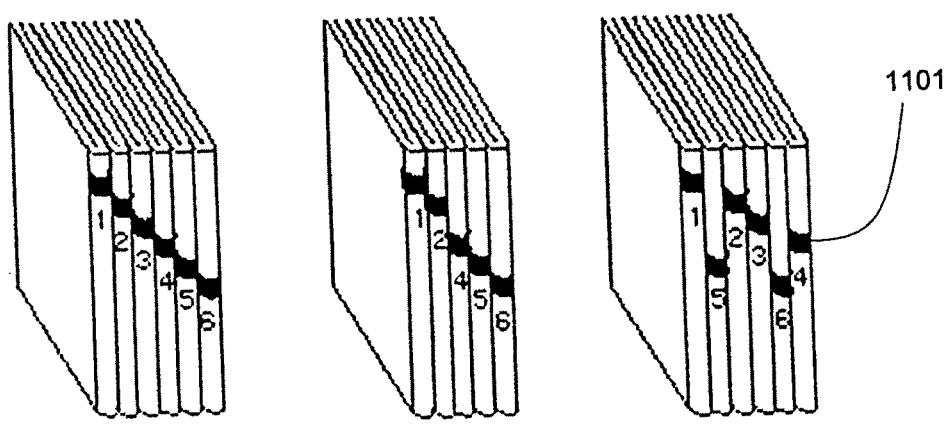
FIG. 11 shows a method of checking the order of multiple folded sheets when bound.

If the sheets have been gathered, any collation marks 1101 can be seen so as to detect missing sections, as shown in FIG. 11. The collection can also be rotated in three-dimensions to check the procedure is error-free. It is also useful at this stage to leaf through the pages of the publication to check the visibility of any printers' marks. The "auto-cut" feature can be used if the document is not yet trimmed. For example, a printers' mark can be designed to reside along a fold line, yet the actual folding may leave part of the mark visible, resulting in an unsightly feature on the printed document. This can be spotted using the representation system 108 and the printers' marks subsequently realigned.

It is at this stage that any other sections of the publication can be dragged into the three dimensional space, for example the cover section object can be imported into the space containing the collected inner section objects. A list of all objects related to a publication or finishing operation is stored in a window available to the GUI. The two sections can then be manipulated to check sizes and the fit for binding, for example the inner can be inserted into the cover.

Figure 10:
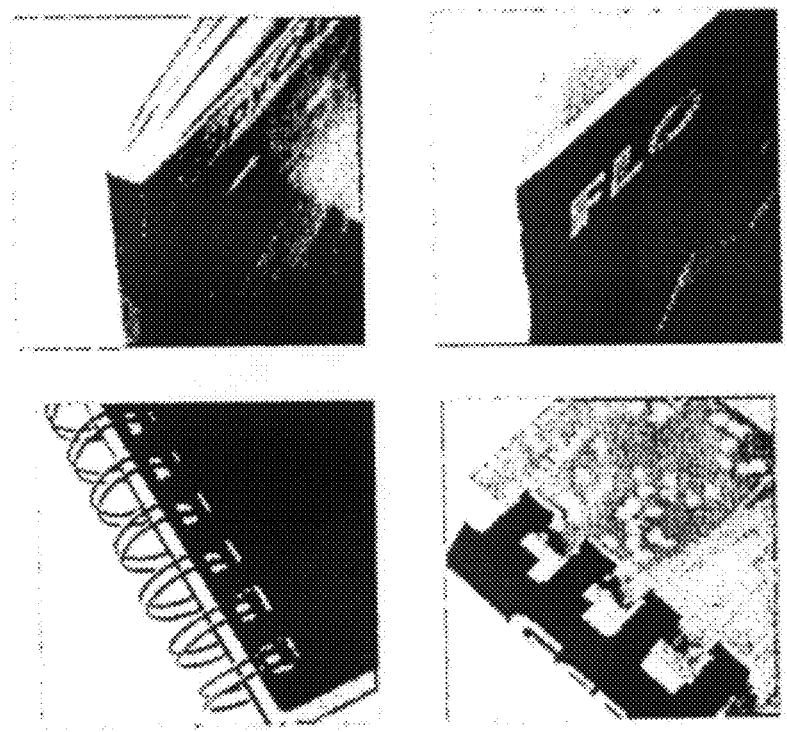
FIG. 10 illustrates four binding examples.

The representation is then ready to be bound, S205. Examples of possible binding options are shown in FIG. 10. The representation system 108 will retrieve the appropriate binding intent from the finishing data and display an animation representative of the physical binding operation. For example, if 'saddle stitch' binding is required then the inner section object will be inserted into the cover object, by applying the appropriate geometric transformation, e.g. surface mating, to the object group, and then the cover will be fixed by a chosen method, e.g. staple. The fixing of sections can be represented as the application of geometric constraints to a staple object with respect to the inner and cover object, e.g. "inner_object_point_location(x, y, z)=outer_object_point_location(x, y, z)". Operator manipulation is then primarily applied to the family object containing both cover and inner. If the publication is to be 'perfect bound' the edge of the cover and inner is 'ground', i.e. in the representation a portion of both objects will be removed, and then glued, i.e. the movement of a plane model of each page will be restrained along the 'glued' edge.

Finally, a trimming operation will be applied to the bound representation, S206. This can be simply achieved by removing a portion of the bound object according to the trim marks and finishing data. This can allow the operator to check the 'bleed' parameters provided in the finishing data, i.e. whether the graphics of a page extend slightly beyond the trim marks of the page to prevent a white line forming if the are small errors in the alignment of the trimming apparatus.

The remaining representation is now a three-dimensional proof 120 of the publication that will be produced using the imposition signature, content data and finishing data initially specified. Thus the representation can be further checked for page orientation and alignment, visibility of printers' marks and page flow. In comparison to prior art three-dimensional proofs, which were generated using only the reader order provide in the original content data, the three-dimensional representation created by the current system will display any features introduced by production of the document. For example, if a fold was incorrectly set, or a different stacking machine was used, this would all be represented in the final proof, whereas this information is ignored by the prior art.

The accuracy of this representation then provides numerous advantages for the pre-press operator. The operator is able to spot any errors or, visual aberrations present in the finished document and alter them before any document or trial copy of a document is made. This saves money and time, in the form of machine costs, media costs, and manual implementation of 'dummy' proofs. As the representation will only model the printing and finishing operations dictated by the operator, the colours and alignment of text and graphics will be entirely representative of the finished document, rather than a copy of the original PDL file. Real-life textures representative of the media selected and a variety of lighting options are available to enhance the quality of the representation. Known rendering modules or the features of the aforementioned modelling suites can provide these effects. Thus a 'contract proof', which is normally printed before the printing line is started to check colour, graphics and text, is not needed.

The final three-dimensional proof can then be sent to the original design team, or the organisation or individual who commissioned the work, to allow customer verification of the finished article before any physical copy is produced. The representations of each finishing step 111 can also be included in the 3D proof output.

The representation system 108 also provides functionality that allows virtual imposition sheets, which can normally be modelled as two-dimensional planes, to have depth. This is implemented by providing a three-dimensional object with height, width and depth parameters based on the media onto which the imposition signature is to be printed. This object can be provided with attributes and methods, using the object-orientated paradigm, which allow a fold to take into account the depth of the media. Thus aberrations such as "creep", the slight but cumulative offset of the edges of inserted folder sheets, and "bottling", the skewing of pages due to paper thickness as it is folded, can be viewed in the representation, by extending the accuracy of the three-dimensional models. Moreover, if any corrective compensation has been added to the imposition signatures to compensate for the above aberrations, the operator can verify their success or any possible side effects.

The sheet object can also be further extended to provide stress and strain coefficients to accurately model the deformation of the media under the forces applied by the printing apparatus. In addition the effect of paper grain direction can also be represented.

Figure 4:
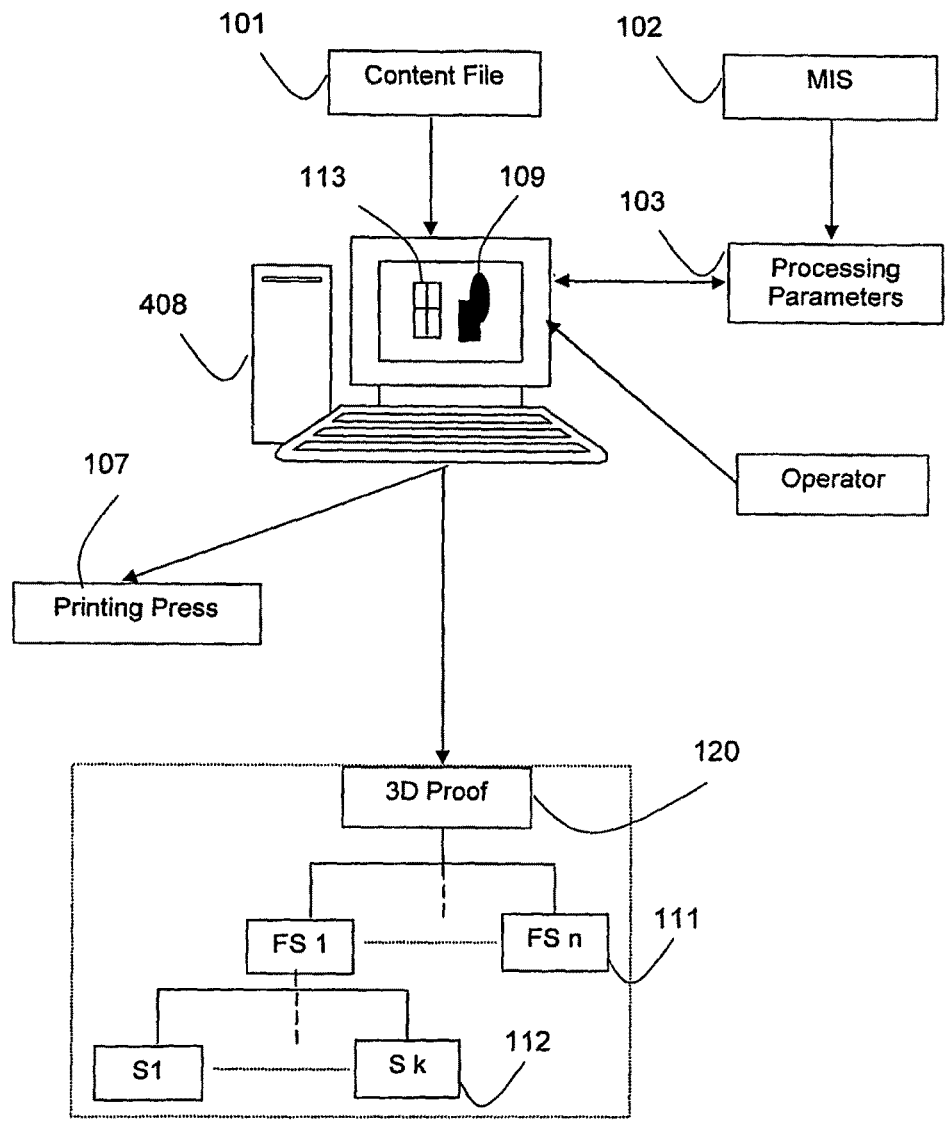
FIG. 4 shows a system of verifying printed documents according to a second embodiment of the current invention.

In a second embodiment of the current invention the imposition creation system and the representation system are combined into a single pre-press system 408. This system is shown in FIG. 4.

An operator will receive the content of the document to be printed in a PDL file 101, or similar, as before, and then proceed to create a new printing job in the combined pre-press system. On creation of a new job the operator will be presented with a wizard in the form of a graphical user interface. This will guide the operator through the printing and finishing parameters 103 that need to be entered, and, as before, may be complemented by optimised decisions based on MIS data.

After the required data has been gathered, an imposition signature will be automatically produced for each section as required and these will be displayed as imposition sheets as previously described. The various finishing steps can then be stepped through as before.

In this embodiment, however, the operator can dynamically change the finishing steps, for example the imposition, folding and binding parameters 103, if they detect an error or an element of the representation they are not happy with. After changing the required parameter the three-dimensional representations are regenerated. This process can occur automatically after each edit or can be initiated by the operator by clicking on a command button after a series of edits.

For example, fold and cut lines can be moved using a 'drag and drop' method and the representation will be regenerated according to this new finishing data. Tool bars, and other graphical user interfaces, are provided to enter new or edited finishing parameters 103. For example, the media type may need to be dynamically changed due to lack of stock, and the effects of using a different media type evaluated. The operator can then select the new media from the appropriate drop-down menu and the parameters of the representation models will be changed accordingly. Thus, the operator can see whether they need to change 'bleed' or 'bottling' parameters 103. In addition if such a change has been made and the imposition has been automatically regenerated by the combined system 408 then the operator can check that the new imposition is correct.

As well as the ability to edit any of the finishing data and readjust the representations accordingly, the combined system provides the ability for the operator to dynamically alter the imposition layout 113 or the location of a particular printers' mark. The alteration can be made from any of the representations, and thus any error detected in a later finishing step representation, can be corrected within that representation, before being altered for conformity in all other representations.

The invention claimed is:

1. A computer-implemented method of printed document verification comprising:
   obtaining content data relating to the content of a document to be printed;
   obtaining imposition data relating to at least one imposition signature which includes data which describes the at least one imposition signature for the document to be printed;
   obtaining finishing data which has been associated in advance with the obtained imposition data, the finishing data comprising geometric data which is necessary to construct a virtual model of the document to be printed, finishing operation data which represents a plurality of finishing operations to be applied in creating the imposition signature, and sequence data which represents a sequence by which the plurality of finishing operations are applied;
   generating a three-dimensional parametric model of a printed imposition sheet at which imposition of the document to be printed is performed using the obtained content data, the obtained imposition data, the geometric data which is extracted from the obtained finishing data, the finishing operation data which is extracted from the obtained finishing data, and the sequence data which is extracted from the obtained finishing data; and
   generating a plurality of three-dimensional objects, which represent each of a plurality of processing operations which are to be applied in creating the imposition signature of the document to be printed, based on the three-dimensional parametric model, and displaying the generated plurality of three-dimensional objects as a three-dimensional electronic output representation in accordance with the sequence represented by the sequence data.

2. A computer-implemented method of printed document verification according to claim 1, further comprising generating the at least one imposition signature in accordance with the content data and a printing and finishing apparatus to be used in generating the printed document.

3. A computer-implemented method of printed document verification according to claim 1, wherein the imposition data describes a plurality of imposition signatures, each imposition signature representing a different printed document section.

4. A computer-implemented method of printed document verification according to claim 1, further comprising generating an electronic imposition sheet representation, which represents the content data as applied to the imposition data prior to the application of the plurality of finishing operations.

5. A computer-implemented method of printed document verification according to claim 4, wherein the electronic output representation is generated by processing the electronic imposition sheet representation so as to apply the plurality of finishing operations to the said imposition sheet representation, in accordance with the finishing data.

6. A computer-implemented method of printed document verification according to claim 5, wherein the generation of an electronic output representation further comprises generating an animation representing the application of the plurality of finishing operations.

7. A computer-implemented method of printed document verification according to claim 5, wherein the method further comprises applying texture effects, lighting effects, or any combination thereof, to the electronic output representation.

8. A computer-implemented method of printed document verification according to claim 1, wherein, after the generation of the electronic output representation, the method further comprises interacting with the electronic output representation.

9. A computer-implemented method of printed document verification according to claim 8, further comprising interacting with the electronic output representation in one or more of the following ways: rotating a representation, opening pages in a representation, zooming into and out of a representation, or translating a representation.

10. A computer-implemented method of printed document verification according to claim 8, wherein the interaction with the electronic output representation is limited to interactions that would be physically possible if the said printed document was produced according to the said plurality of finishing operations.

11. A computer-implemented method of printed document verification according to claim 8, wherein an operator is provided with a graphical user interface to facilitate interaction with the electronic output representation.

12. A computer-implemented method of printed document verification according to claim 1, the method further comprising dynamically editing the imposition data or finishing data after the generation of the output representation and re-generating the output representation based on the said edited data.

13. A computer-implemented method of printed document verification according to claim 1, wherein the plurality of finishing operations comprise at least one of: creasing, cutting, embossing, gluing, perforating, strapping, stacking, folding, collecting, ganging, gathering, binding or trimming.

14. A computer-implemented method of printed document verification according to claim 1, wherein the finishing data is obtained using additional management data obtained from a management information system.

15. A computer-implemented method of printed document verification according to claim 1, further comprising generating electronic output representations for each finishing operation.

16. A non-transitory computer readable storage medium storing a program for causing a computer to execute the steps which configure the method of claim 1.

17. A printed document verification system comprising:
an input device adapted to obtain content data relating to the content of a document to be printed, imposition data relating to at least one imposition signature which comprises data describing the at least one imposition signature for the document to be printed, and finishing data which comprises geometric data which is necessary to construct a virtual model of the document to be printed, finishing operation data which represents a plurality of finishing operations to be applied in creating the imposition signature, and sequence data which represents a sequence by which the plurality of finishing operations are applied;
a representation system comprising a processor adapted to generate a three-dimensional parametric model of a printed imposition sheet at which imposition of the document to be printed is performed using the content data obtained by the input device, the imposition data obtained by the input data, geometric data which is extracted from the finishing data obtained by the input device, finishing operation data which is extracted from the finishing data obtained by the input device, and sequence data which is extracted from the finishing data obtained by the input device; and
a display device adapted to generate a plurality of three-dimensional objects, which represent each of a plurality of processing operations which are to be applied in creating the imposition signature of the document to be printed, based on the three-dimensional parametric model and display the generated plurality of three-dimensional objects as a three-dimensional electronic output representation in accordance with the sequence represented by the sequence data.

18. A printed document verification system according to claim 17, wherein the input device comprises at least one of: a mouse, a tablet, a touch screen, a network connection, or a digital media reader.

* * * * *